US 7,599,018 B2

(12) United States Patent
Shen et al.

(10) Patent No.: US 7,599,018 B2
(45) Date of Patent: Oct. 6, 2009

(54) SYSTEMS FOR DISPLAYING IMAGES INCLUDING LIQUID CRYSTAL DISPLAY MODULES

(75) Inventors: Jui-Hsieh Shen, Hsinchu (TW); Yi-Hui Chang, Hsinchu (TW)

(73) Assignee: TPO Displays Corp., Chu-Nan (TW)

( * ) Notice: Subject to any disclaimer, the term of this patent is extended or adjusted under 35 U.S.C. 154(b) by 259 days.

(21) Appl. No.: 11/524,708

(22) Filed: Sep. 21, 2006

(65) Prior Publication Data

US 2007/0132906 A1  Jun. 14, 2007

Related U.S. Application Data

(60) Provisional application No. 60/748,815, filed on Dec. 8, 2005.

(51) Int. Cl.
*G02F 1/1333* (2006.01)
(52) U.S. Cl. .................................... 349/58; 455/575.1
(58) Field of Classification Search ............ 455/550.1, 455/575.1, 575.8, 566, 558, 128; 349/58
See application file for complete search history.

(56) References Cited

U.S. PATENT DOCUMENTS

| 5,175,873 A | 12/1992 | Goldenberg et al. |
| 2004/0147294 A1* | 7/2004 | Nuovo ..................... 455/575.1 |
| 2005/0101356 A1* | 5/2005 | Hutchison ................... 455/566 |
| 2005/0124393 A1* | 6/2005 | Nuovo et al. ............. 455/575.1 |

FOREIGN PATENT DOCUMENTS

JP   2005242423   9/2005

OTHER PUBLICATIONS

English translation of JP 2005-242423, Sep. 9, 2005.*

* cited by examiner

*Primary Examiner*—Hemang Sanghavi
(74) *Attorney, Agent, or Firm*—Liu & Liu

(57) ABSTRACT

Systems for displaying images are provided. An embodiment of a system comprises a liquid crystal display device with a liquid crystal display module incorporated thereinto. The flat display module primarily includes a display unit, a plastic frame, a bezel and a flexible sealant disposed between the plastic frame and the bezel. The plastic frame surrounds the display unit and has a protrusion. During assembly, the protrusion is inlaid into the flexible sealant to seal the gap between the plastic frame and the bezel, thereby preventing incursion of dust into the display unit.

20 Claims, 11 Drawing Sheets

SYSTEMS FOR DISPLAYING IMAGES INCLUDING LIQUID CRYSTAL DISPLAY MODULES

BACKGROUND OF THE INVENTION

1. Field of the Invention

The invention relates in general to systems for displaying images including liquid crystal display modules and in particular to liquid crystal display modules preventing incursion of dust.

2. Description of the Related Art

Referring to FIG. 1, a conventional touch panel type liquid crystal display module primarily comprises a plastic frame 10, a bezel 20, a rear shield 30, a touch panel 40, a flexible sealant R, a display unit 50 and a backlight unit 60, wherein the plastic frame 10 surrounds the display unit 50 and the backlight unit 60. As shown in FIG. 1, the plastic frame 10, the display unit 50 and the backlight unit 60 are encompassed by the bezel 20 and the rear shield 30. The touch panel 40 is adhered to the bezel 20 and positioned over the display unit 50. The touch panel 40 is an user interface, allowing the user to interface with the display module and/or the computing device operatively coupled thereto, by simply touching the touch sensitive surface of the touch panel, instead of or in addition to using a keyboard, for example.

It is desirable to prevent dust from getting into the space between the touch panel 40 and the display unit 50. Dust could deteriorate image quality, and potentially damage the display unit 50 and/or touch panel 40. To prevent dust penetration, a flexible sealant R, such as adhesive tape, sponge or rubber, is disposed between the bezel 20 and a flat surface 101 of the plastic frame 10. The sealant R extends under the bezel 20, from the frame 10 to the display unit 50. During assembly, the flexible sealant R is compressed and deformed by the plastic frame 10 and the bezel 20 to form the seal to prevent dust from outside entering the space between the display unit 50 and the touch panel 40, through the space between the bezel 20 and the rear shield. 30. When double sided adhesive tape is used as the sealant R, the tape makes it harder to disassemble the parts of the display module for servicing, and could result in breakage of the panel 40 when the bezel is being removed. When non-adhesive type of sealant R is used (e.g., sponge or rubber), it allows for relatively easy disassembly and reassembly of parts, but requires a good fit between the frame 10 and the bezel 20, in order to form a good seal with the sealant R therebetween and along bezel and plastic frame. However, a good fit requires increased interference between parts, which requires higher tolerance. It has been challenging to maintain the required tolerance between and along the frame 10 and the bezel 20 consistently, given that the bezel is a stamped thin metal frame which inherently has local bendings and distortions along the longitudinal sections of the thin bezel, thus resulting in variations in the seal gap along and between longitudinal sections of the bezel and the plastic frame. Such variations in seal gap could result in sufficient opening around the sealant to allow dust to penetrate into the space between the display unit 50 and the touch panel 40.

What is needed is a structure that provides an improved dust seal.

SUMMARY OF THE INVENTION

The present invention provides a surface texture (e.g., a ridge structure or a longitudinal protrusion) at the sealing interface between the bezel and the plastic frame, facilitates an improved the seal between and along the bezel and the plastic frame. The surface texture is provided on at least one of the facing surfaces between which a flexible gasket or sealant is deployed to form a seal. In one embodiment, the surface texture is provided on the plastic frame. The surface texture interacts with the flexible sealant in a manner that accommodates variations in the seal gap between and along the bezel and the plastic frame. The surface texture bites, presses or biases into the flexible sealant, to an extent more or less, depending on variations in the seal gap between and along the bezel and the plastic frame, thus providing a consistent barrier against external environment such as dust.

A detailed description is given in the following embodiments with reference to the accompanying drawings. Systems for displaying images are provided. An embodiment of a system comprises a liquid crystal display device with a liquid crystal display module incorporated thereinto. The flat display module primarily includes a display unit, a plastic frame, a bezel and a flexible sealant disposed between the plastic frame and the bezel. The plastic frame surrounds the display unit and has a protrusion. During assembly, the protrusion is inlaid into the flexible sealant to seal the gap between the plastic frame and the bezel, thereby preventing incursion of dust into the display unit.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
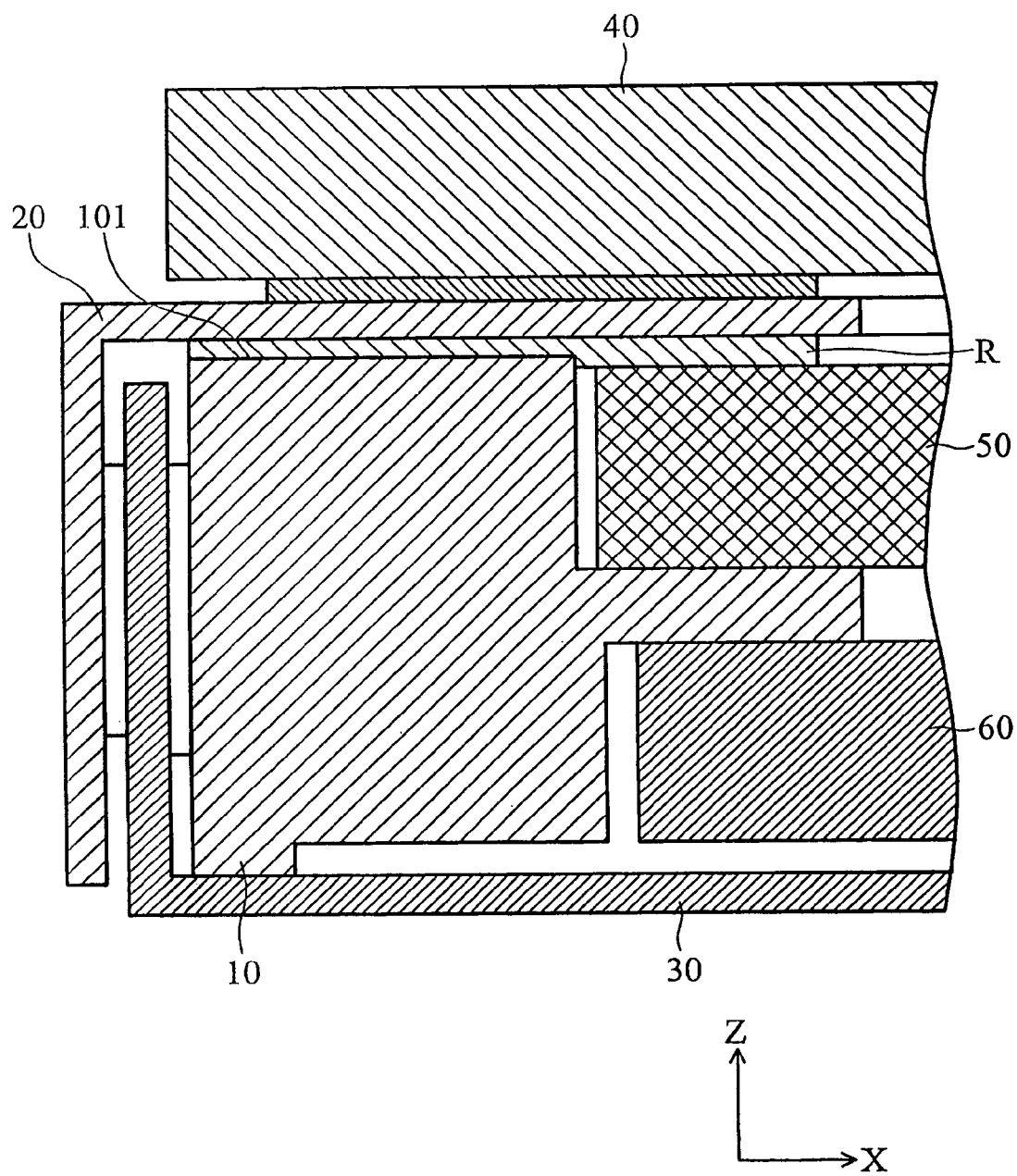
FIG. 1 is a sectional view at one edge of a conventional liquid crystal display module.
Figure 2:
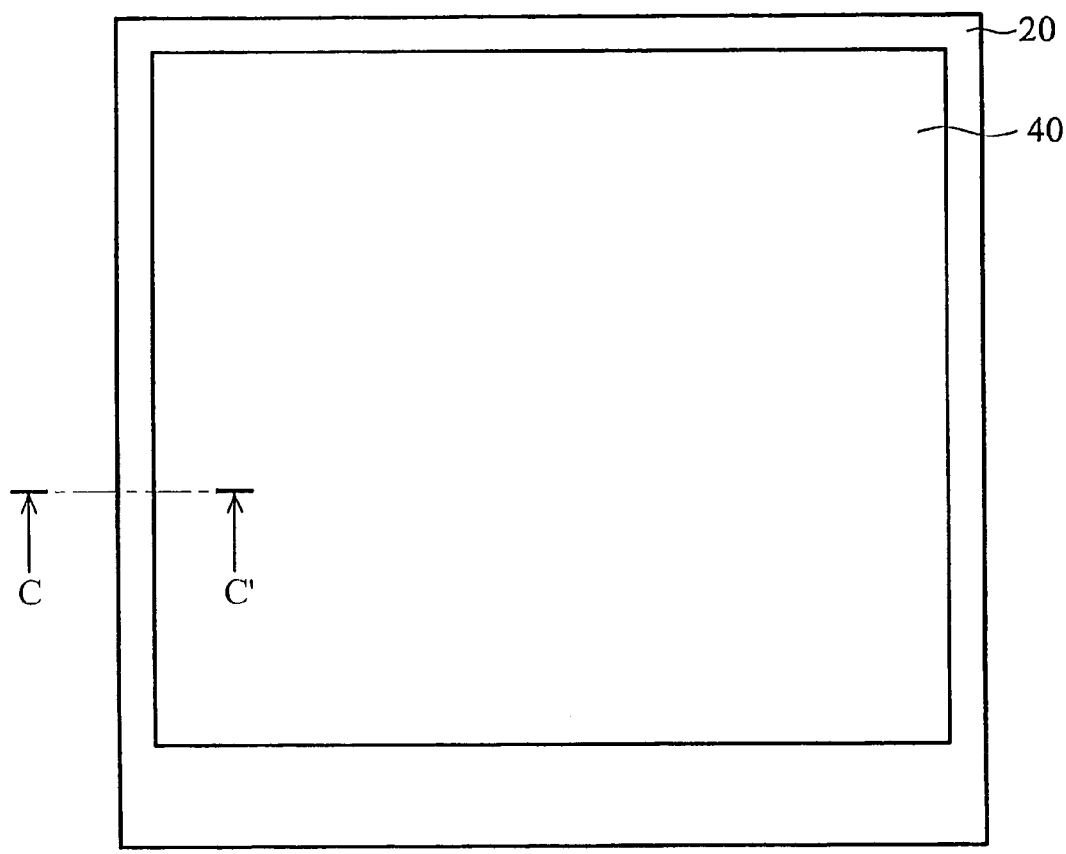
FIG. 2 is a plan view of a liquid crystal display module in a system for displaying images, which incorporates the novel sealing structure in accordance with one embodiment of the present invention.
Figure 3:
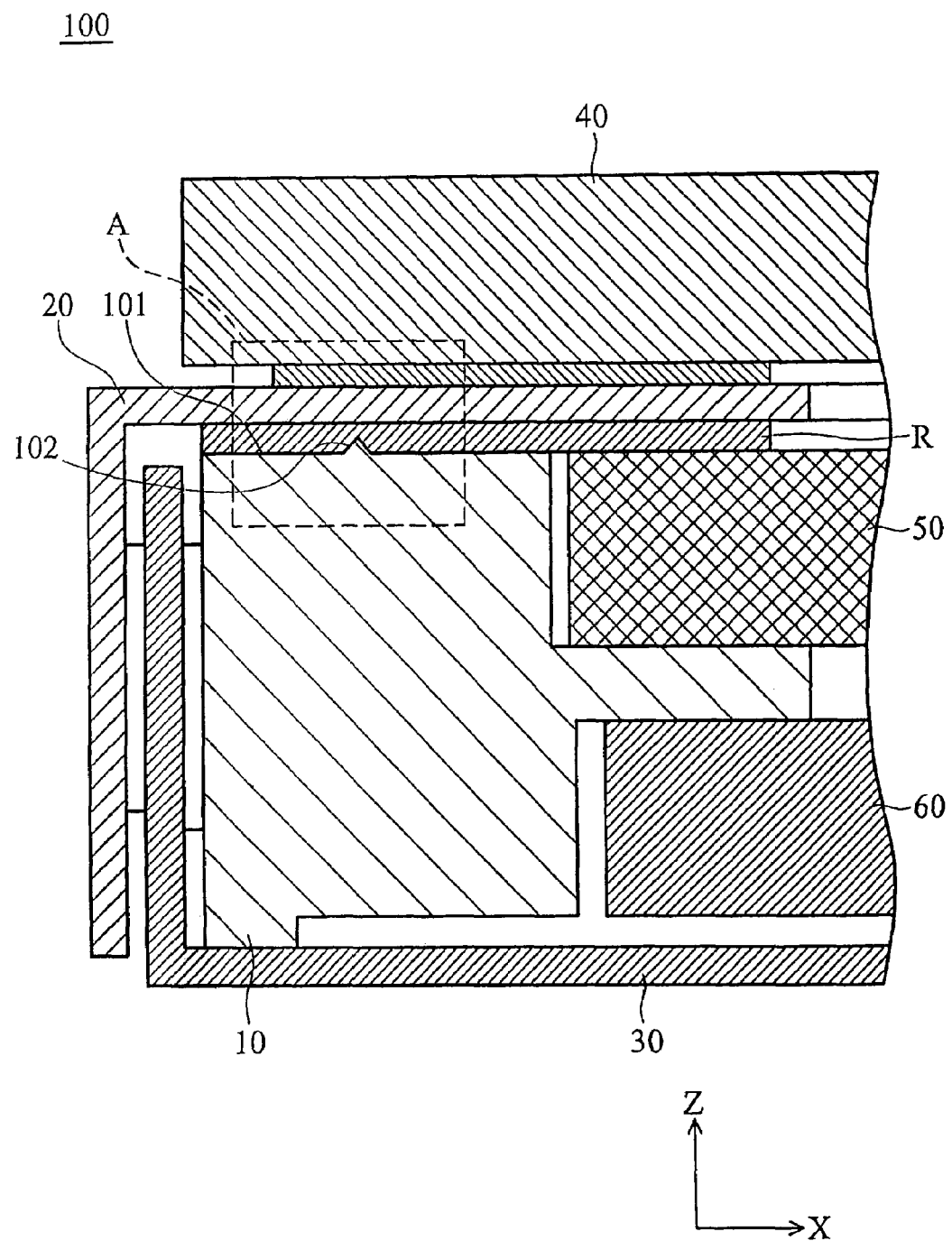
FIG. 3 is a sectional view of an edge of the inventive liquid crystal display module, taken along line C-C' in FIG. 2.

Referring to FIG. 2 and FIG. 3, an embodiment of a liquid crystal display module 100 in a system for displaying images primarily comprises a plastic frame 10, a bezel 20, a rear shield 30, a touch panel 40, a flexible sealant R, a display unit 50 and a backlight unit 60, wherein the plastic frame 10 surrounds the display unit 50 and the backlight unit 60. As shown in FIG. 3, the plastic frame 10, the display unit 50 and the backlight unit 60 are encompassed by the bezel 20 and the rear shield 30. The touch panel 40 adheres to the bezel 20 and positioned over the display unit 50. The flexible sealant R, such as adhesive/non-adhesive tape, sponge or rubber, is disposed between the bezel 20 and a flat surface 101 of the plastic frame 10, to prevent incursion of dust into the display unit 50. During assembly, the flexible sealant R is compressed and deformed by the plastic frame 10 and the bezel 20.

Figure 4A:
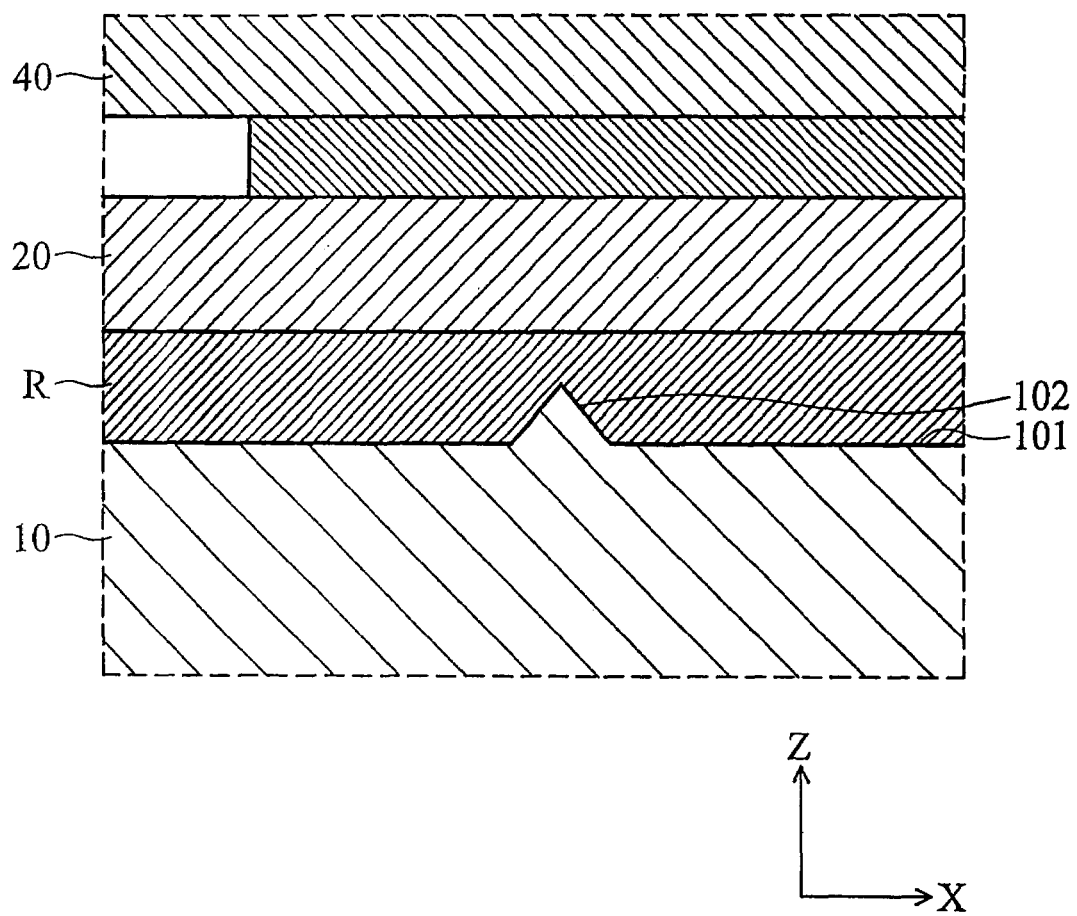
FIG. 4A is an enlarged view of portion A in FIG. 3.

As shown in FIGS. 3 and 4A, a surface texture such as a longitudinal protrusion 102 may be provided at the sealing interface between the bezel 20 and the surface 101 of the plastic frame 10, to facilitate an improved the seal between and along the bezel and the plastic frame. The surface texture is provided on at least one of the facing surfaces (i.e., the bezel 20 and the surface 101 of the frame 10) between which a flexible gasket or sealant is deployed to form the seal. In the illustrated embodiment, the surface texture is provided on the plastic frame, but it can also be provided on the underside of the bezel.

Figure 4B:
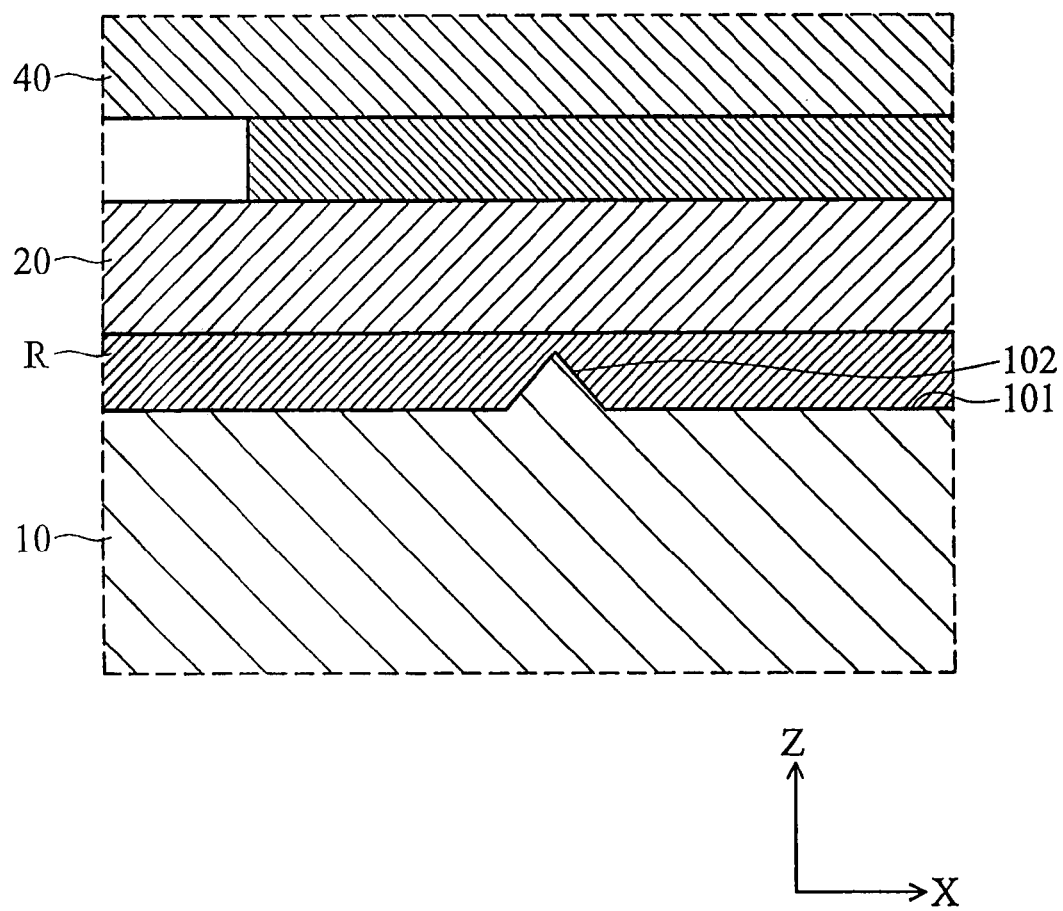
FIG. 4B is an enlarged view of a different portion A along the longitudinal section of the bezel where a different seal gap thickness is present.
Figure 4C:
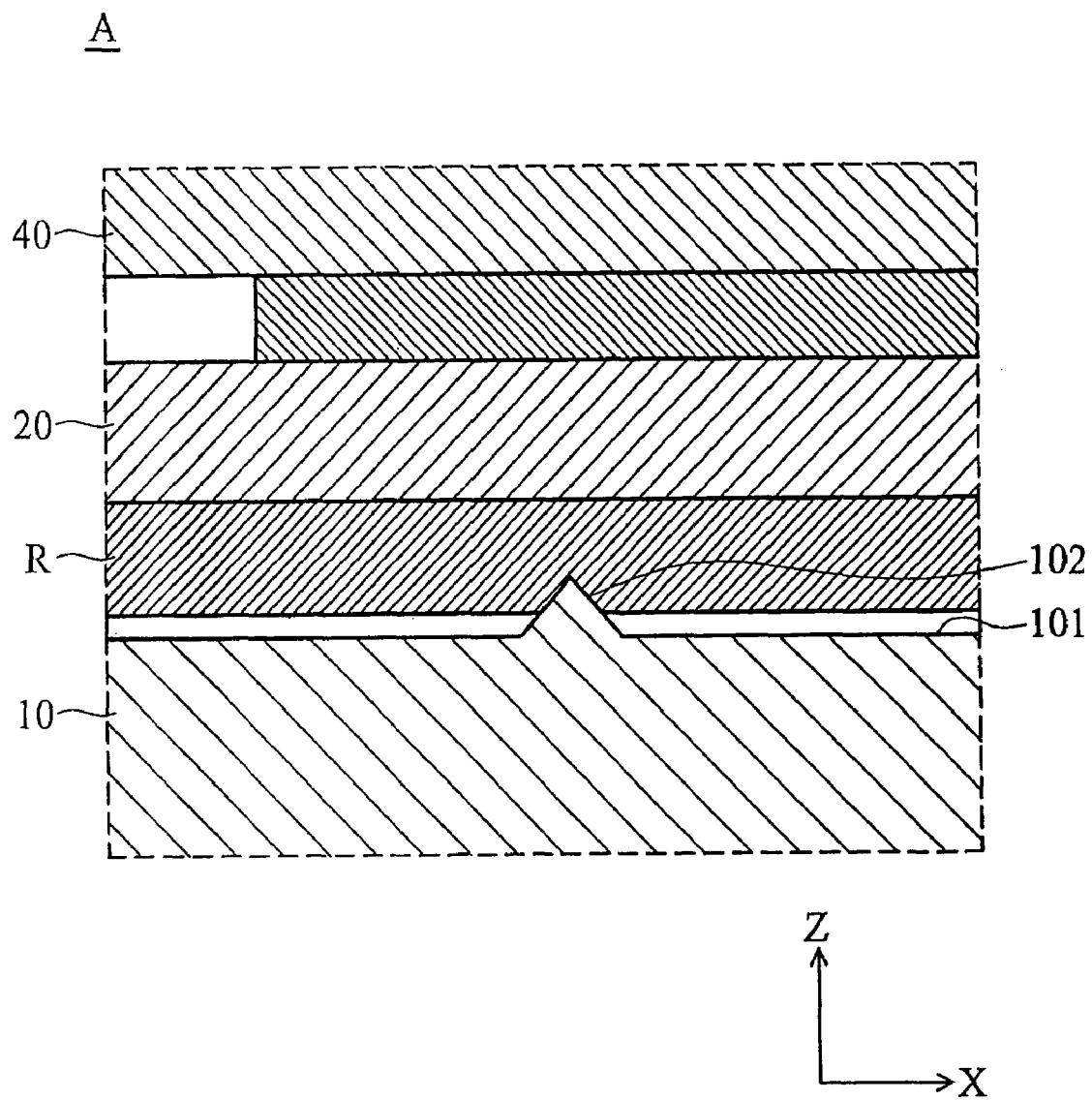
FIG. 4C is yet another portion A along the longitudinal section of the bezel where a different gap thickness is present.
Figure 4D:
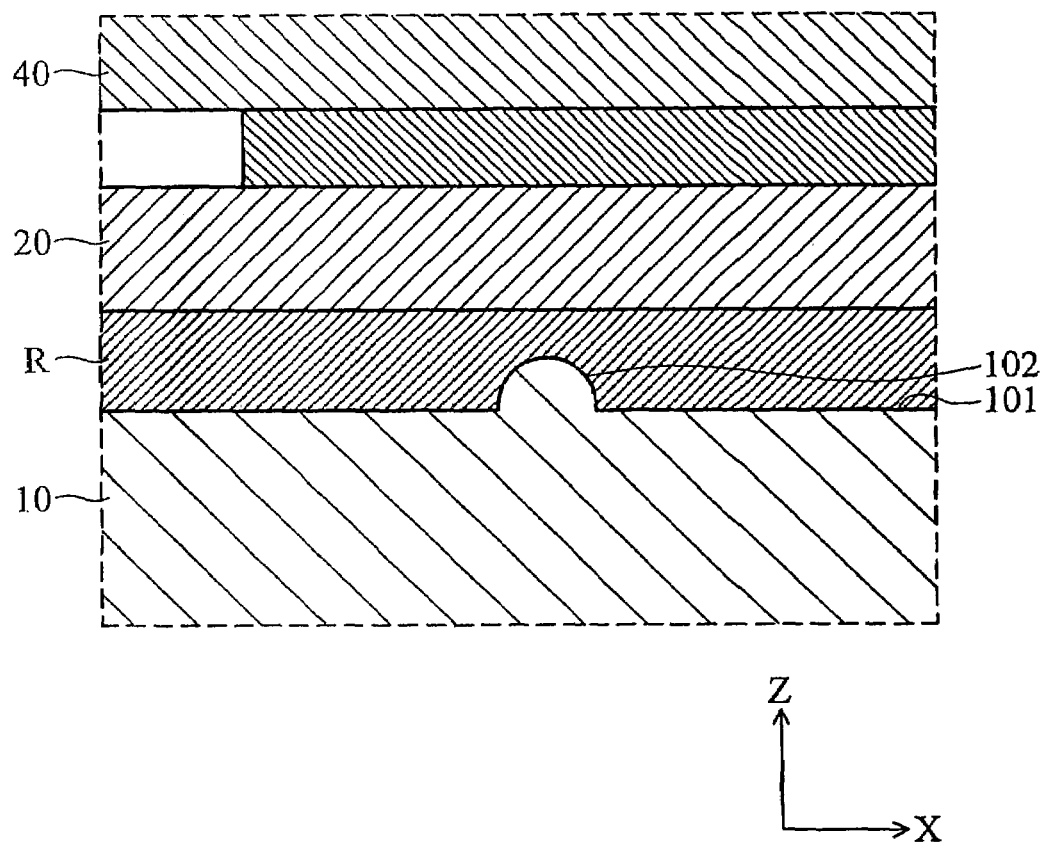
FIG. 4D is an enlarged view of a different portion A in FIG. 3 where the protrusion is round in cross-section.
Figure 4E:
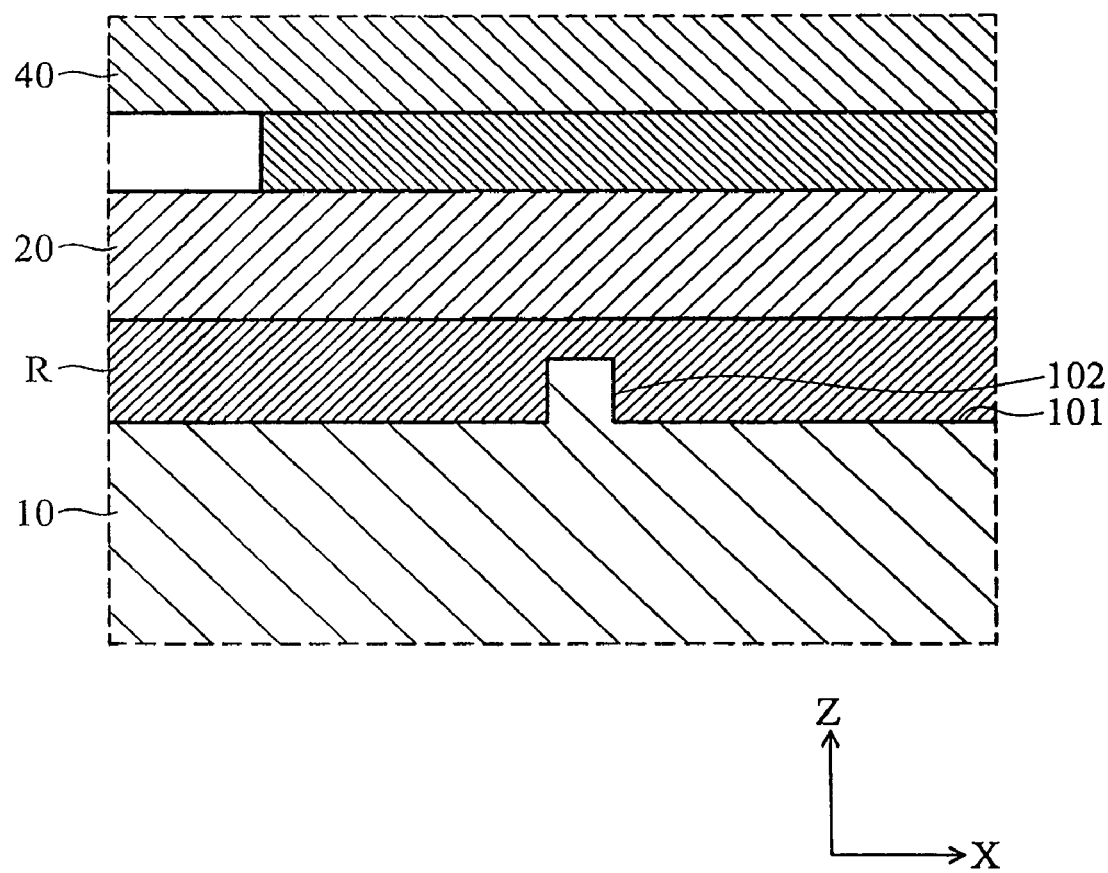
FIG. 4E is an enlarged view of a different portion A in FIG. 3 where the protrusion is square in cross-section.
Figure 4F:
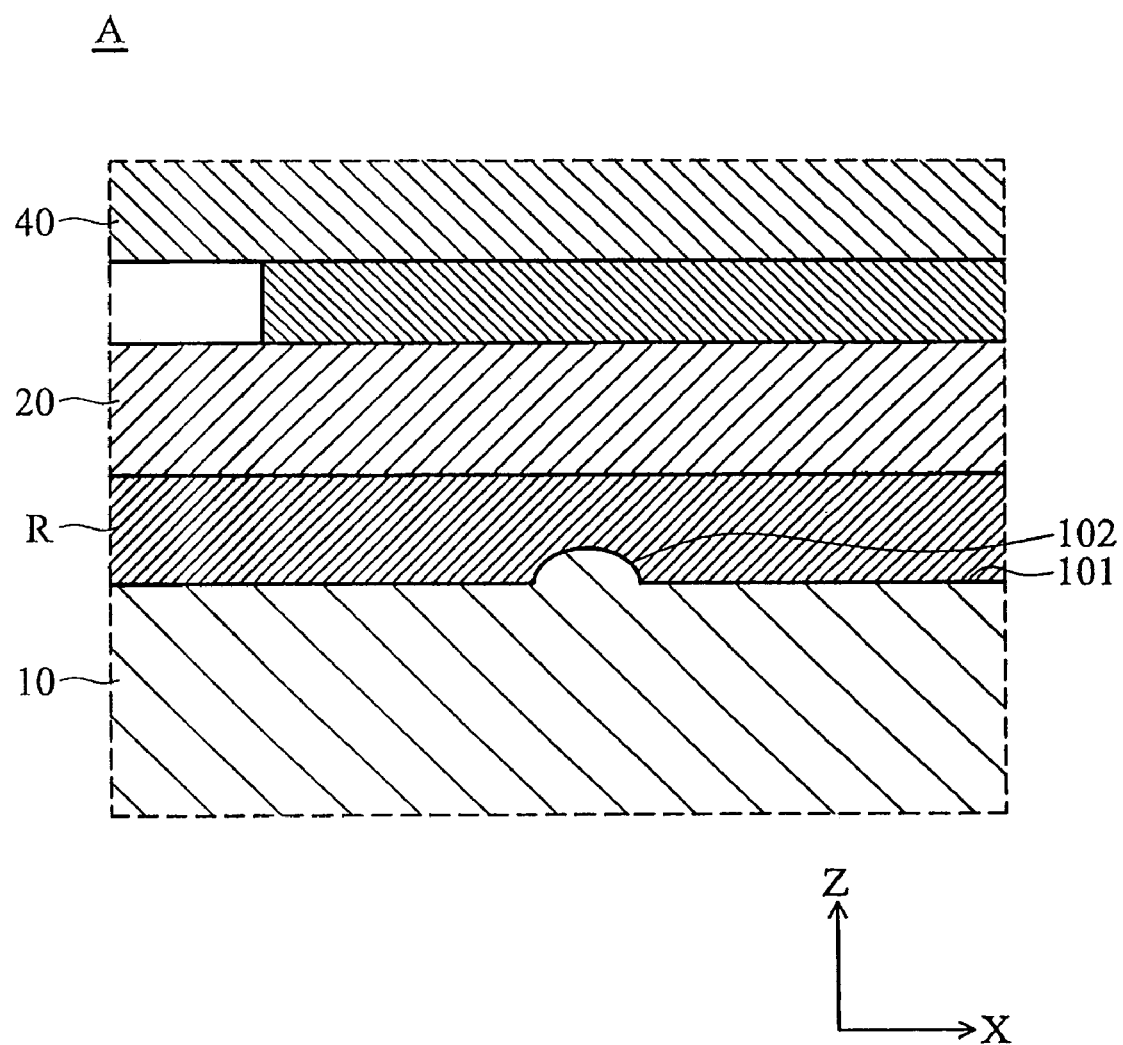
FIG. 4F is an enlarged view of a different portion A in FIG. 3 where the protrusion is oval in cross-section.
Figure 4G:
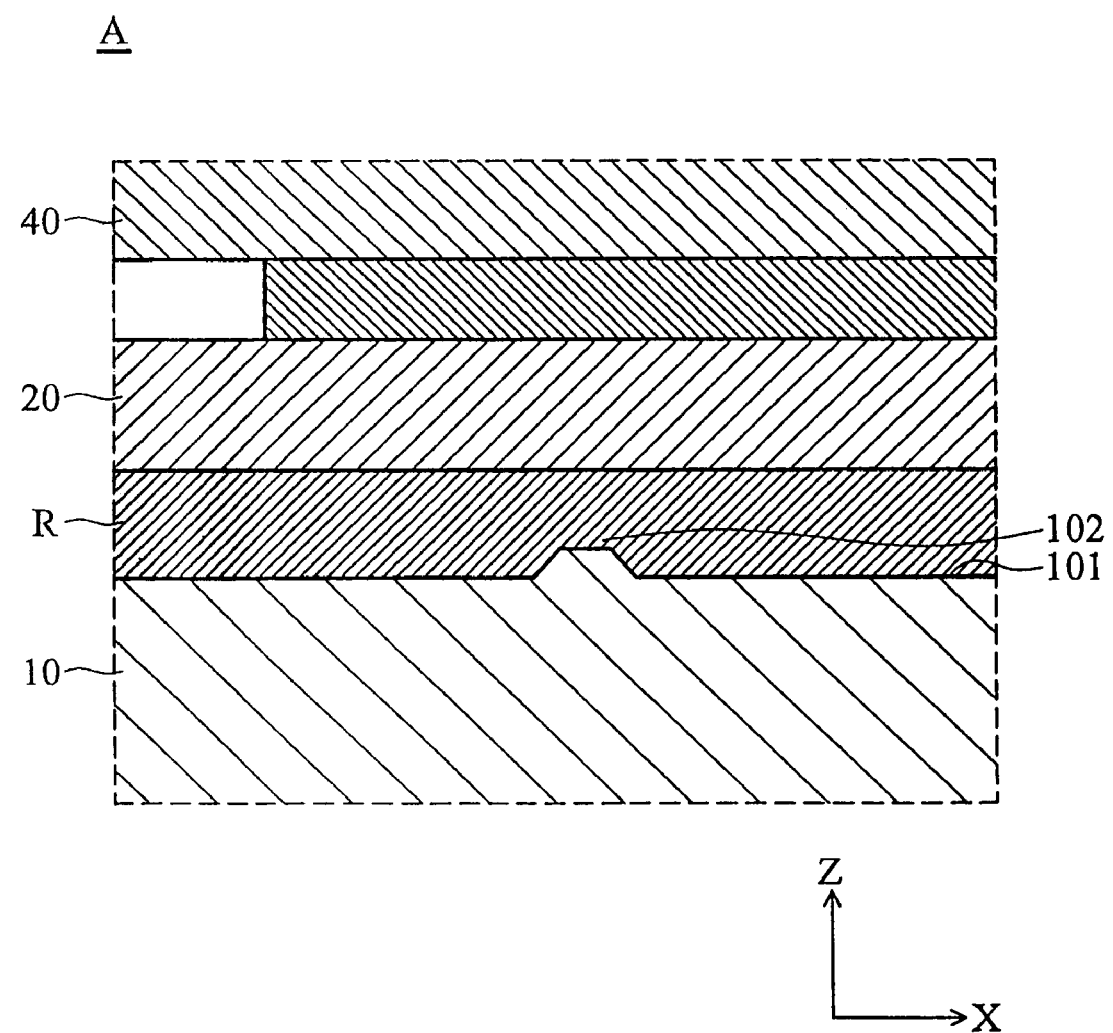
FIG. 4G is an enlarged view of a different portion A in FIG. 3 where the protrusion is trapezoid in cross-section.

The protrusion 102 interacts with the flexible sealant R in a manner that accommodates variations in the seal gap between and along the bezel and the plastic frame. The protrusion 102 presses, bites or biases into the flexible sealant R along the longitudinal sections of the bezel 20 and frame 10, to an extent more or less, depending on variations in the seal gap between and along the bezel 20 and the plastic frame 10. At different locations along the longitudinal bezel 20 and plastic frame 10 sections, the gap size may vary as shown in FIGS. 4A, 4B and 4C. If the gap between the bezel 20 and the surface 101 is small (e.g., the gap is less than thickness of sealant R so that the sealant R is compressed, as shown in FIG. 4B), the protrusion 102 bites deeper into the flexible sealant R. For larger gap (e.g., the gap is larger than the thickness of the sealant R so that the sealant R is not compressed, as shown in FIG. 4C, and a clearance is present between the sealant R and the surface 101), the protrusion 102 bites less deep into the flexible sealant R, but because the protrusion 102 bites into the sealant R nonetheless, a seal is formed. For a gap that is the same thickness as the sealant R, as shown in FIG. 4A (i.e., the flexible sealant is not in a compressed state and no clearance is present between the sealant R and the surface 101; the vertex of the protrusion 102 being not as close to the underside of the bezel 20 as compared to FIG. 4B), the protrusion 102 provides an interlocking structure with the sealant R to form a seal. Thus a consistent barrier along and between the bezel 20 and the surface 101 of the plastic frame 10 is achieved, to provide a barrier against external environment such as dust. Essentially, even though the sealant R is not thick enough to fill the gap between the bezel 20 and the surface 101, the height of the protrusion 102 reduces the gap by as much as the height of the protrusion 102, to offset for any clearance that may be present between the sealant R and the surface 101.

In the illustrated embodiment, the protrusion 102 is an integral part of the plastic frame 10. The cross-section of the ridge-like longitudinal protrusion 102 is triangular. The height of the triangular protrusion 102 should be less than the thickness of the sealant R, to avoid the protrusion 102 from completely protruding through the sealant R. The height of the protrusion 102 may be between 30% and 90% of the thickness of the sealant R. Higher protrusion 102 heights would accommodate a larger variation of the gap between the bezel 20 and the surface 101.

In some embodiments, the protrusion 102 is disposed in a local region beside the display unit 50, depending on the sealing tightness requirements between the plastic frame 10 and the bezel 20. Moreover, the protrusion 102 can also be a closed strip surrounding the display unit 50, such that the display unit 50 is sealed all around. Various cross-sectional geometries may be deployed for the protrusion 102 without departing from the scope and spirit of the present invention.

For example, the protrusion 102 may be round, square, triangular, oval, or trapezoid in cross-section, as shown in FIGS. 4D–4G. In some embodiments, a plurality of protrusions 102 are provided in several regions of the flat surface 101, to enhance local sealing tightness between the bezel 20 and the plastic frame 10. (e.g., in a concentric format)

Other forms of surface texture besides a longitudinal protrusion 102 may be provided at the sealing interface between the bezel 20 and the surface 101 of the plastic frame 10, to facilitate an improved seal between and along the bezel 20 and the plastic frame 10. For example, opposing protrusions (not shown) may be provided, with one protrusion extending from the underside of the bezel and another protrusion extending from the surface 101. The opposing protrusions may be offset laterally by a distance, so that the opposing protrusions would not meet when the sealant R is compressed.

Figure 5:
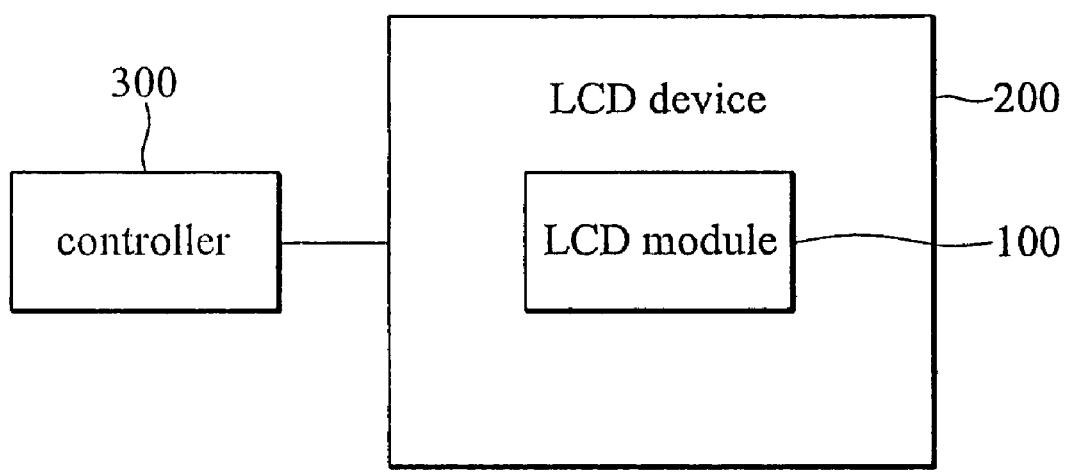
FIG. 5 is a perspective diagram of a system for displaying images.

FIG. 5 schematically shows a embodiment of a system for displaying images. The system comprises an electronic device 400 such as a laptop computer, a mobile phone, a digital camera, a personal digital assistant (PDA), a desktop computer, a television, a car display or a portable DVD player. As shown in FIG. 5, the display device 200 can be incorporated into the electronic device 400, and the described liquid crystal module 100 of FIG. 3 can be incorporated into the liquid crystal display device 200. The electronic device 400 further comprises a controller 300 coupled to the liquid crystal display device 200, which controller 300 is operative to control the liquid crystal module 100 to render images in accordance with an image data input.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for displaying images, comprising:
   a display unit;
   a plastic frame surrounding the display unit, comprising a protrusion;
   a bezel covering the plastic frame, facing the protrusion; and
   a flexible sealant, disposed between the plastic frame and the bezel, wherein the protrusion is inlaid into the flexible sealant to seal a gap between the plastic frame and the bezel to prevent incursion of dust to the display unit.

2. The system as claimed in claim 1, wherein the plastic frame further comprises a flat surface with the protrusion extending therefrom.

3. The system as claimed in claim 1, wherein the flexible sealant is pressed and deformed by the protrusion.

4. The system as claimed in claim 1, wherein the protrusion is round in cross-section.

5. The system as claimed in claim 1, wherein the protrusion is square in cross-section.

6. The system as claimed in claim 1, wherein the protrusion is triangular in cross-section.

7. The system as claimed in claim 1, wherein the protrusion is oval in cross-section.

8. The system as claimed in claim 1, wherein the protrusion is trapezoid in cross-section.

9. The system as claimed in claim 1, wherein the flexible sealant is adhesive tape.

10. The system as claimed in claim 1, wherein the flexible sealant is sponge.

11. The system as claimed in claim 1, wherein the flexible sealant comprises rubber.

12. The system as claimed in claim 1, wherein the plastic frame comprising a plurality of protrusions inlaid into the flexible sealant.

13. A liquid crystal display device comprising the system for displaying images as claimed in claim 1.

14. An electronic device comprising the liquid crystal display device as claimed in claim 13; and a controller operatively coupled to the liquid crystal display device to control the operation of the liquid crystal display device to render the image in accordance with an image data.

15. The electronic device as claimed in claim 14, wherein the electronic device is at least one of a laptop computer, a mobile phone, a digital camera, a personal digital assistant (PDA), a desktop computer, a television, a car display and a portable DVD player.

16. A liquid crystal display module, comprising:
a display unit;
a plastic frame surrounding the display unit;
a bezel covering the plastic frame, wherein at least one of the bezel or the plastic frame comprises a surface texture; and
a flexible sealant interfacing between the plastic frame and the bezel, wherein the surface texture presses against the sealant to form a seal between the bezel and the plastic frame to provide a barrier against dust intrusion.

17. The module as claimed in claim 16, further comprising a touch panel positioned relative to the display unit and against the bezel, wherein a space is defined between the touch panel and the display unit, and wherein the flexible sealant provides a barrier against dust intrusion into said space.

18. The module as claimed in claim 16, wherein surface texture comprises a longitudinal protrusion extending from a surface of the bezel or the plastic frame.

19. The module as claimed in claim 18, wherein the protrusion comprises a longitudinal ridge-like structure.

20. The module as claimed in claim 19, wherein the protrusion extends from the surface of the plastic frame, and integral to the plastic frame.

* * * * *